United States Patent
Huang et al.

(10) Patent No.: US 11,825,499 B2
(45) Date of Patent: Nov. 21, 2023

(54) CSI REPORT AND DL GRANT

(71) Applicant: QUALCOMM Incorporated, San Diego, CA (US)

(72) Inventors: Yi Huang, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 17/465,208

(22) Filed: Sep. 2, 2021

(65) Prior Publication Data
US 2022/0078810 A1    Mar. 10, 2022

Related U.S. Application Data

(60) Provisional application No. 63/075,063, filed on Sep. 4, 2020.

(51) Int. Cl.
*H04W 72/54* (2023.01)
*H04L 5/00* (2006.01)
*H04W 72/0446* (2023.01)
*H04W 72/23* (2023.01)

(52) U.S. Cl.
CPC .......... *H04W 72/54* (2023.01); *H04L 5/0051* (2013.01); *H04W 72/0446* (2013.01); *H04W 72/23* (2023.01)

(58) Field of Classification Search
CPC . H04W 72/54; H04W 72/0446; H04W 72/23; H04W 24/08; H04L 5/0051; H04L 5/0057
See application file for complete search history.

(56) References Cited

U.S. PATENT DOCUMENTS

| | | | | |
|---|---|---|---|---|
| 2013/0308572 A1* | 11/2013 | Sayana | ............... | H04W 28/06 370/329 |
| 2017/0359745 A1* | 12/2017 | Lee | ................ | H04L 5/0048 |
| 2019/0014568 A1* | 1/2019 | Nilsson | ................ | H04B 7/088 |
| 2019/0349171 A1* | 11/2019 | Lee | ................ | H04W 24/10 |
| 2020/0295903 A1* | 9/2020 | Faxér | ................ | H04L 1/1812 |
| 2021/0168839 A1* | 6/2021 | Su | ................ | H04L 5/0044 |

* cited by examiner

*Primary Examiner* — Christine Ng
(74) *Attorney, Agent, or Firm* — QUALCOMM Incorporated

(57) ABSTRACT

Methods, computer program products, and apparatuses for a dynamic indication of measurement sources for CSI reporting are provided. An example method at a UE includes receiving DCI including a DL grant. The example method further includes measuring the CSI based on a set of resources for measuring CSI based on the DL grant. The example method further includes transmitting at least one aperiodic CSI report associated with the CSI measurements. An example method at a base station includes transmitting a DL DCI including a DL grant to a UE. The DL grant indicating a set of resources for measuring CSI. The example method further includes receiving, based on the DL grant, at least one aperiodic CSI report associated with CSI measurements of the UE.

27 Claims, 10 Drawing Sheets

CSI REPORT AND DL GRANT

CROSS REFERENCE TO RELATED APPLICATION(S)

This application claims the benefit of and priority to U.S. Provisional Application Ser. No. 63/075,063, entitled "DYNAMIC INDICATION OF MEASUREMENT SOURCE FOR CSI REPORT TRIGGERED BY DL GRANT" and filed on Sep. 4, 2020, which is expressly incorporated by reference herein in its entirety.

TECHNICAL FIELD

The present disclosure relates generally to communication systems, and more particularly, to wireless communication systems with channel state information (CSI) reporting.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer programs products, and apparatuses for dynamic indication of measurement sources for CSI reporting are provided. In one aspect of the disclosure, a method, a computer-readable medium, and an apparatus are provided for wireless communication of a user equipment (UE). A UE may receive downlink (DL) control information (DCI) including a DL grant. The UE may measure channel state information (CSI) based on a set of resources in which to measure the CSI based on the DL grant. The UE may transmit at least one aperiodic CSI report associated with the CSI measurements.

In another aspect of the disclosure, a method, a computer-readable medium, and an apparatus are provided for wireless communication of a base station. A base station may transmit DL DCI including a DL grant to a UE. The DL grant may indicate a set of resources for measuring CSI. The base station may receive, based on the DL grant, at least one aperiodic CSI report associated with CSI measurements of the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
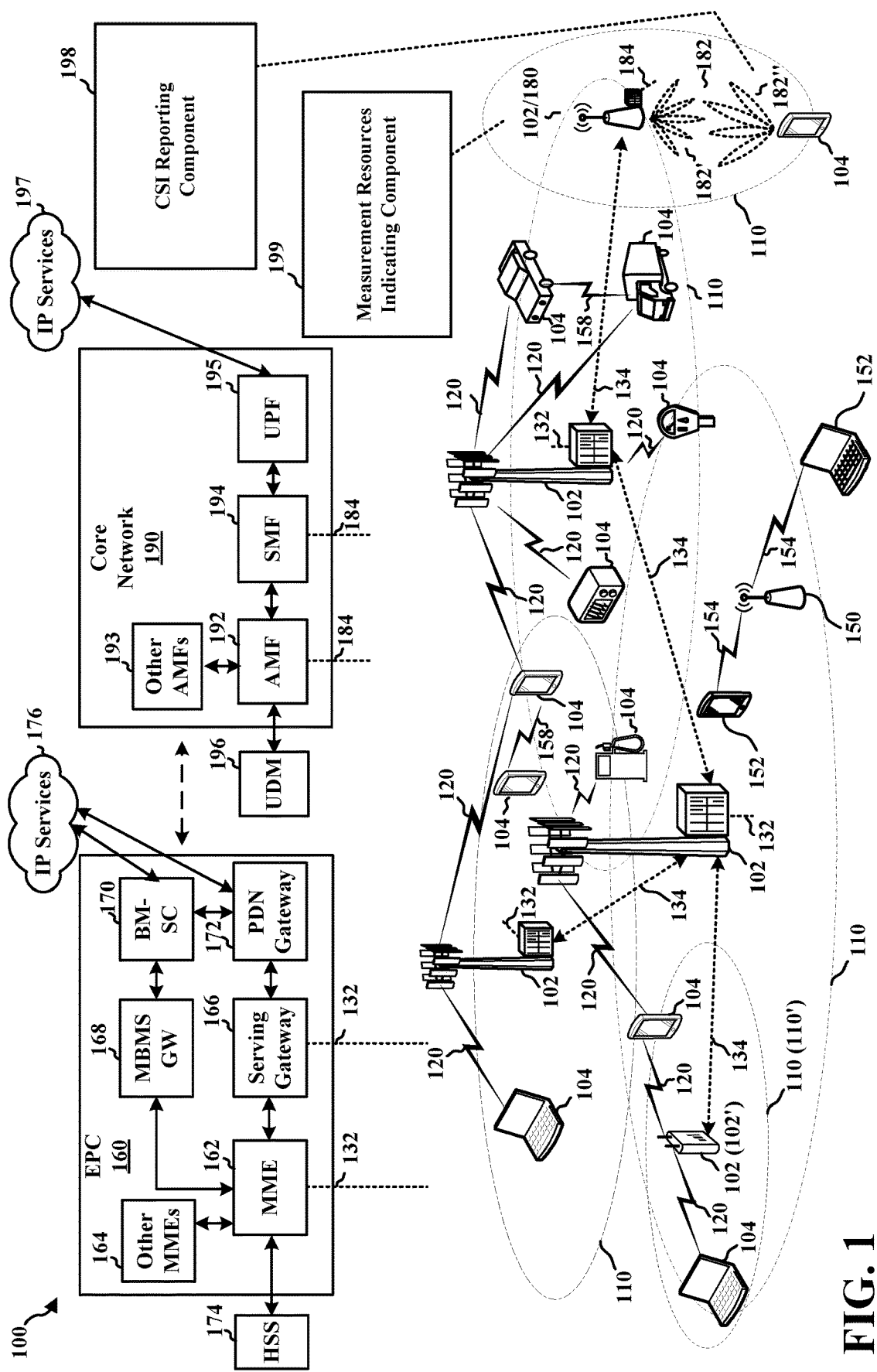
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may include CSI reporting component 198 configured to receive DL DCI including a DL grant. The CSI reporting component 198 may also be configured to measure CSI based on a set of resources in which to measure the CSI based on the DL grant. The CSI reporting component 198 may also be configured to transmit at least one aperiodic CSI report associated with the CSI measurements. In certain aspects, the base station 180 may include measurement resources indicating component 199. The measurement resources indicating component 199 may be configured to transmit DL DCI including a DL grant to the UE 104. The DL grant may indicate a set of resources for measuring CSI. The measurement resources indicating component 199 may also be configured to receive, based on the DL grant, at least one aperiodic CSI report associated with CSI measurements of the UE 104. Although the following description may be focused on 5G NR, the concepts described herein may be applicable to other similar areas, such as LTE, LTE-A, CDMA, GSM, and other wireless technologies.

Although the following description may be focused on 5G NR, the concepts described herein may be applicable to other similar areas, such as LTE, LTE-A, CDMA, GSM, and other wireless technologies.

Figure 2:
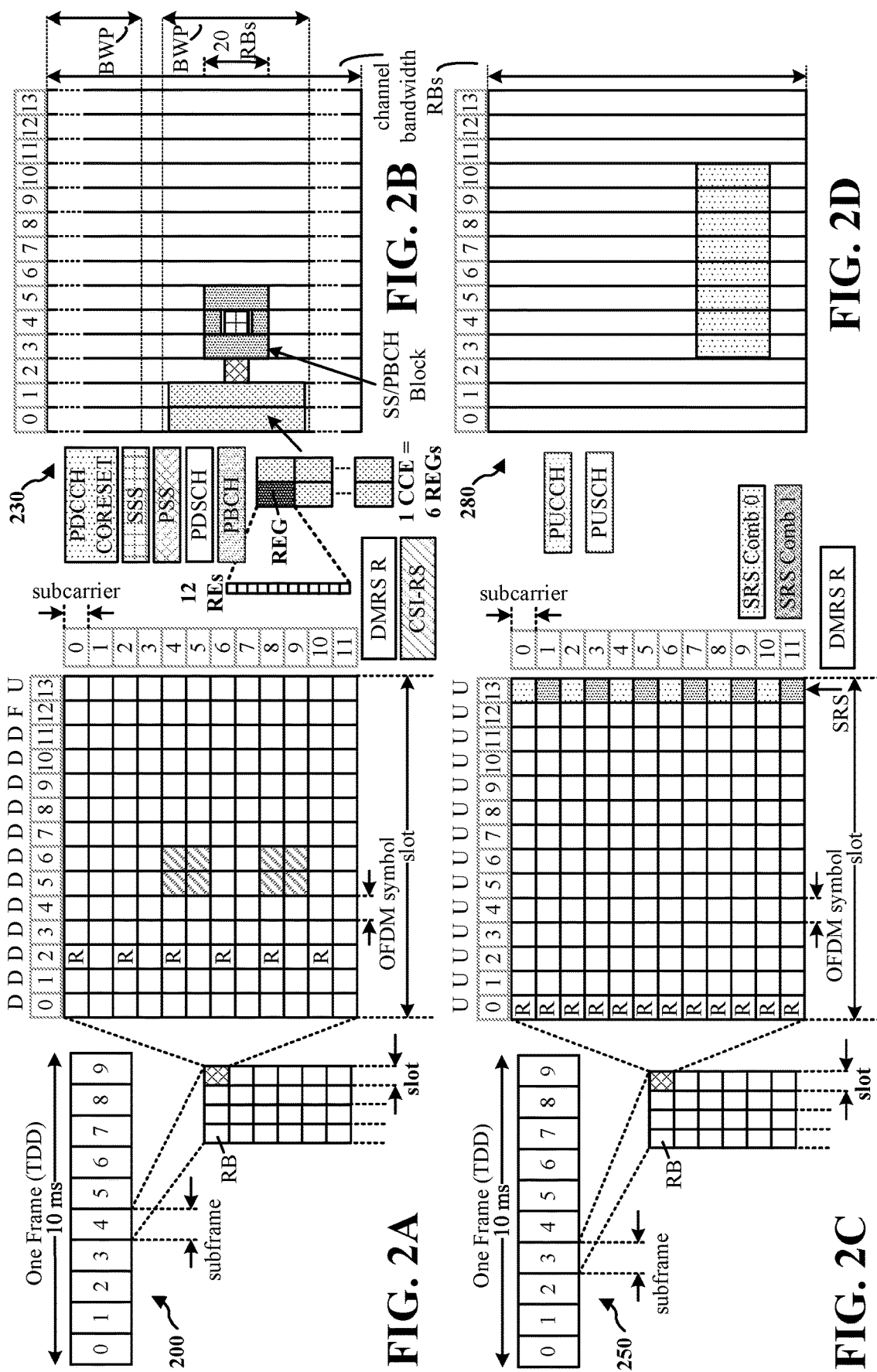
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and 2 slots/subframe. The subcarrier spacing may be equal to 2^y*15 kHz, where y is the numerology 0 to 4. As such, the numerology $\mu$=0 has a subcarrier spacing of 15 kHz and the numerology $\mu$=4 has a subcarrier spacing of 240 kHz. The symbol length/duration is inversely related to the subcarrier spacing. FIGS. 2A-2D provide an example of normal CP with 14 symbols per slot and numerology $\mu$=2 with 4 slots per subframe. The slot duration is 0.25 ms, the subcarrier spacing is 60 kHz, and the symbol duration is approximately 16.67 s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
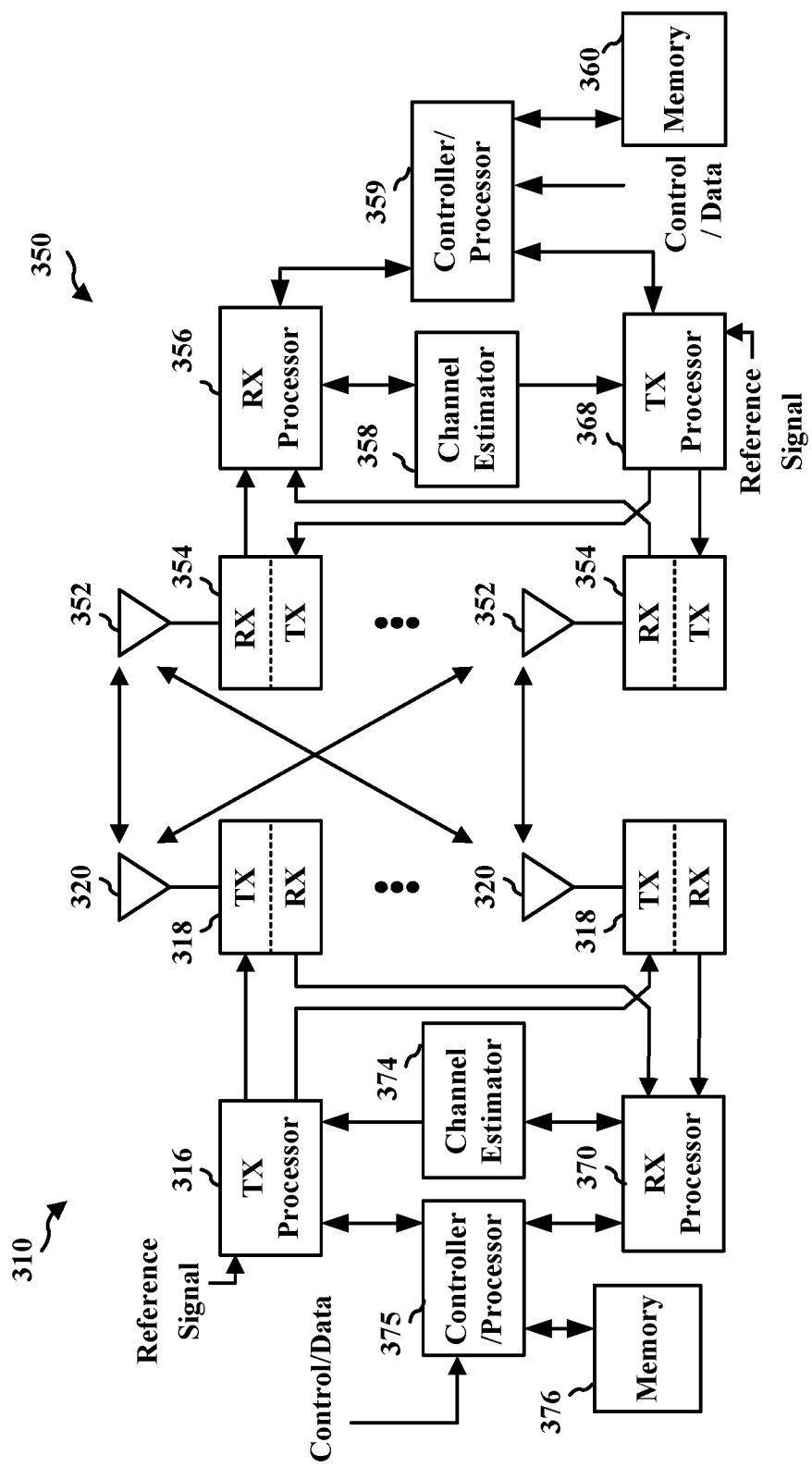
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with CSI reporting component 198 of FIG. 1.

At least one of the TX processor 316, the RX processor 370, and the controller/processor 375 may be configured to perform aspects in connection with measurement resources indicating component 199 of FIG. 1.

In some wireless communication systems, a base station may schedule a UE to transmit an aperiodic CSI report on a PUSCH using a UL grant. The base station may also use a DL grant to trigger an aperiodic CSI report on a PUCCH. The aperiodic CSI report on the PUCCH may enable faster aperiodic CSI reporting than aperiodic CSI reporting on the PUSCH. With faster aperiodic CSI reporting on the PUCCH, the UE may provide the base station with more up-to-date CSI information, which may be used by the base station to improve PUSCH performance and overall communication quality, such as increasing reliability and reducing latency.

With the DL grant triggered aperiodic CSI reporting, the DL grant may have two functionalities. First, the DL grant may schedule a PDSCH and associated HARQ feedback. Second, the DL grant may schedule the aperiodic CSI report from the UE to the base station/network. To generate the aperiodic CSI report, the UE may perform CSI measurements based on a PDSCH/PDCCH that includes embedded DM-RS, decoding statistics on the PDSCH/PDCCH, or a dedicated CSI-RS that may be triggered by the DL grant.

Figure 4:
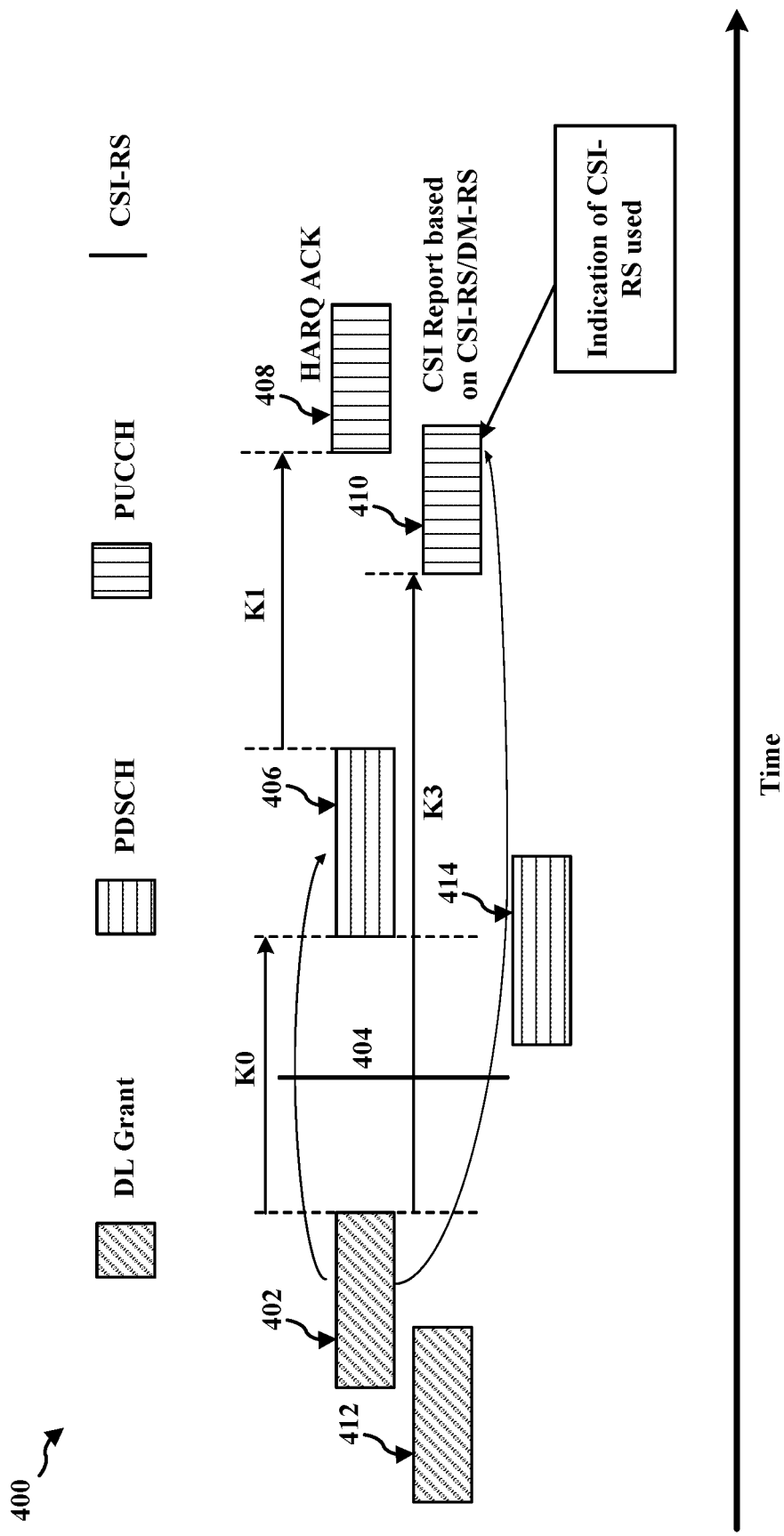
FIG. 4 illustrates an example communication between a base station and a UE.

FIG. 4 illustrates an example communication 400 for transmitting aperiodic CSI based on measurement resources dynamically indicated in a DL grant. As illustrated in FIG. 4, a base station may transmit a DL grant 402 to a UE. The base station may further transmit a PDSCH 406 to the UE. Responsive to receiving the PDSCH, the UE may transmit a HARQ ACK in a PUCCH 408 to the base station. The DL grant 402 may schedule the PDSCH 406 and the corresponding PUCCH 408 for the HARQ ACK. The DL grant 402 may further trigger or indicate dedicated CSI-RS 404 for CSI measurements. If the dedicated CSI-RS 404 is triggered/indicated for CSI measurements, the UE may perform CSI measurements based on the CSI-RS and transmit a CSI report in a PUCCH 410. If the dedicated CSI-RS is not triggered/indicated for CSI measurements, the UE may perform CSI measurements based on a DM-RS embedded in a PDSCH/PDCCH, such as the PDSCH 406, a PDSCH 414, a DL grant 412, or other PDSCH/PDCCH transmissions that include an embedded DM-RS. In some aspects, instead of using the DM-RS, the UE may use decoding statistics generated based on decoding the PDSCH/PDCCH to generate the CSI measurement. In some aspects, if the dedicated CSI-RS 404 is triggered/indicated for CSI measurements, the UE may perform CSI measurements based on the CSI-RS and additionally perform CSI measurements based on the decoding statistics or the DM-RS embedded in a PDSCH/PDCCH, such as the PDSCH 406, the PDSCH 414, the DL grant 412, or other PDSCH/PDCCH transmissions that include an embedded DM-RS. In some aspects, the CSI measurements based on the CSI-RS and the CSI measurements based on the DM-RS/decoding statistics may be included in the same CSI report in the PUCCH 410. In some aspects, the CSI measurements based on the CSI-RS and the CSI measurements based on the DM-RS/decoding statistics may be included in different CSI reports in the PUCCH 410.

As shown in FIG. 4, K0 may indicate a delay between the DL grant 402 and the corresponding PDSCH 406. K1 may indicate a delay between DL data (the PDSCH 406) and a corresponding HARQ feedback transmission on the PUCCH 408. K3 may indicate a delay between the DL grant 402 and the corresponding CSI report on the PUCCH 410.

In some aspects, the UE may be configured with a set of CSI-RSs and the dedicated CSI-RS may be one CSI-RS in the set of CSI-RSs. In some aspects, even if the DL grant 402 does not trigger/indicate the dedicated CSI-RS, the UE may determine to perform CSI measurements based on a CSI-RS after determining a channel quality in association with DL communication, such as the PDSCH 406, is below a threshold. The UE may select one CSI-RS from the set of CSI-RSs to perform the CSI measurements and transmit a CSI report on PUCCH 410. In some aspects, the UE may further include an indication of the CSI-RS used for the CSI measurements in the CSI report in the PUCCH 410.

In some aspects, the UE may determine to perform CSI measurements based on a CSI-RS and the DM-RS/decoding statistics after determining a channel quality in association with DL communication (such as the PDSCH 406) is below a second threshold. The UE may select one CSI-RS from the set of CSI-RSs to perform the CSI measurements and transmit a CSI report on PUCCH 410. In some aspects, the UE may further include an indication of the CSI-RS used for the CSI measurements in the CSI report in the PUCCH 410. In some aspects, the CSI measurements based on the CSI-RS and the CSI measurements based on the DM-RS/decoding statistics may be included in the same CSI report in the PUCCH 410. In some aspects, the CSI measurements based on the CSI-RS and the CSI measurements based on the DM-RS/decoding statistics may be included in different CSI reports in the PUCCH 410.

Figure 5:
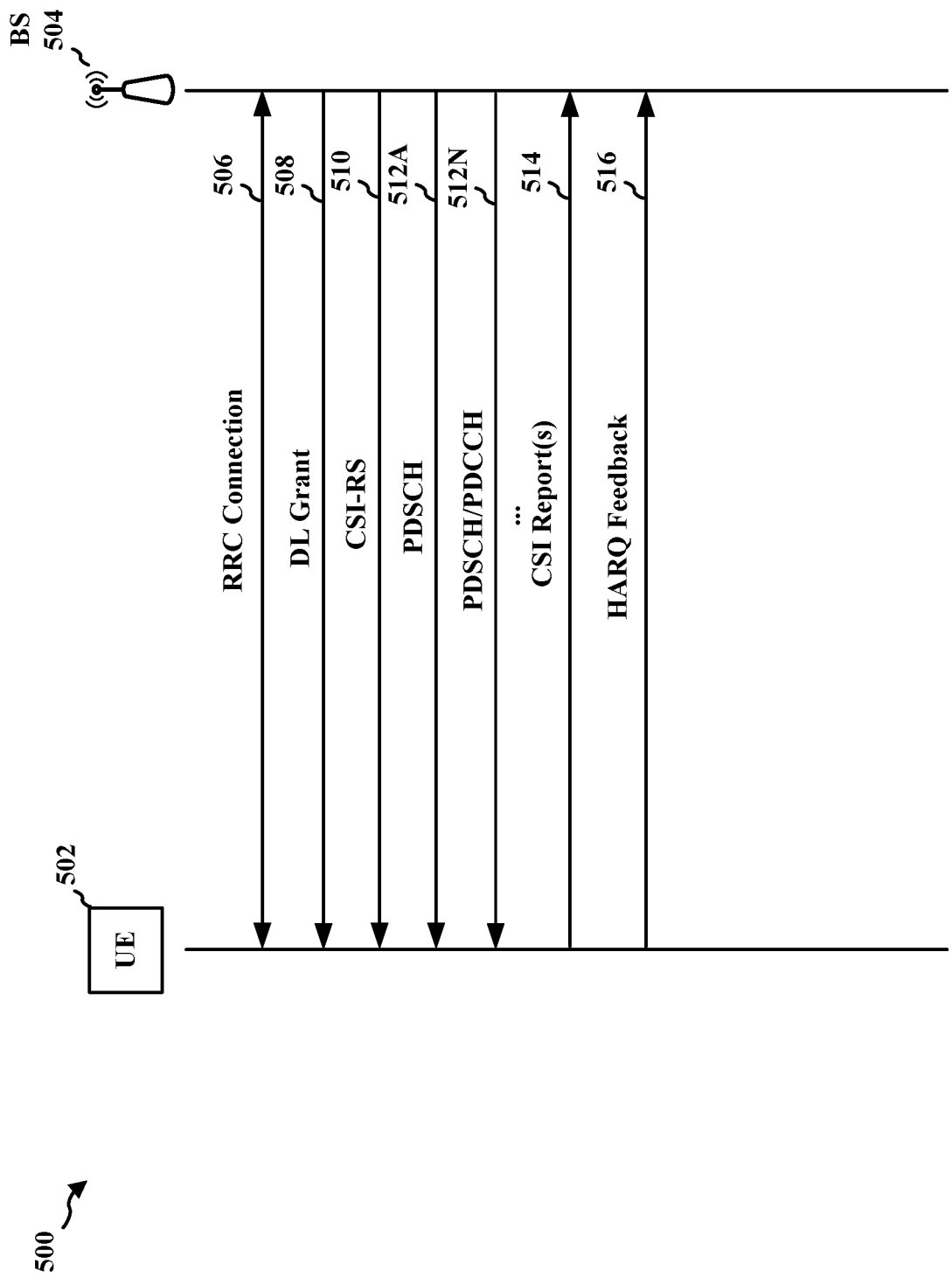
FIG. 5 illustrates an example communication between a base station and a UE.

FIG. 5 illustrates an example communication flow 500 that includes a UE 502 and a base station 504. As illustrated in FIG. 5, the UE 502 and base station 504 may establish RRC connection 506. In some aspects, via the RRC connection 506, the base station 504 may configure the UE 502 to perform CSI reporting based on a DL grant, such as a DL grant 508. The base station 504 may transmit the DL grant 508 to the UE 502. The DL grant 508 may schedule a PDSCH 512A and the corresponding PUCCH for a HARQ feedback 516 for the PDSCH 512A. The DL grant 508 may further trigger or indicate dedicated CSI-RS 510 for CSI measurements. The UE 502 may perform CSI measurements and transmit a CSI report 514 to the base station 504 in a PUCCH. In some aspects, the PUCCH carrying the CSI report 514 may be different from a PUCCH carrying the HARQ feedback 516. In some aspects, the PUCCH carrying the CSI report 514 may be the PUCCH carrying the HARQ feedback 516.

In some aspects, if the dedicated CSI-RS 510 is triggered/indicated for CSI measurements, the UE 502 may perform CSI measurements based on the CSI-RS. If the dedicated CSI-RS is not triggered/indicated for CSI measurements, the UE 502 may perform CSI measurements based on a DM-RS embedded in a PDSCH/PDCCH, such as the PDSCH 512A or another PDSCH/PDCCH 512N that may include an embedded DM-RS. In some aspects, if the dedicated CSI-RS 510 is triggered/indicated for CSI measurements, the UE 502 may perform CSI measurements based on the CSI-RS and additionally perform CSI measurements based on the DM-RS. In some aspects, the CSI measurements based on the CSI-RS and the CSI measurements based on the DM-RS may be included in the same CSI report 514 transmitted from the UE 502 to the base station 504. In some aspects, the CSI measurements based on the CSI-RS and the CSI measurements based on the DM-RS may be included in different CSI reports transmitted from the UE 502 to the base station 504.

Figure 6A:
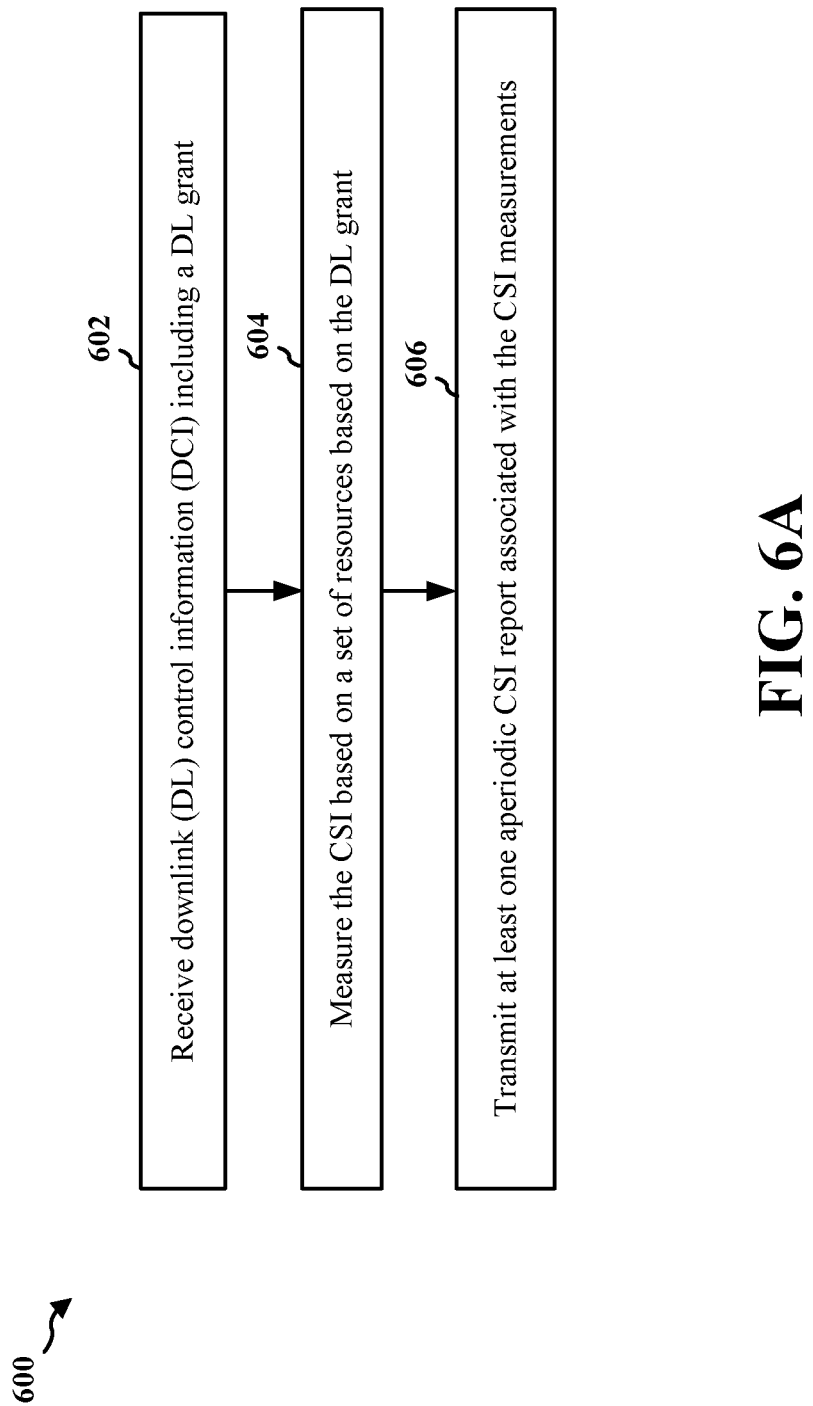
FIG. 6A is a flowchart of a method of wireless communication at a UE.

FIG. 6A is a flowchart 600 of a method of wireless communication. The method may be performed by a UE (e.g., the UE 104, the UE 502; the apparatus 802). The method may help to provide a base station with more up-to-date CSI information which may be used to improve the communication between the base station and the UE.

At 602, the UE receives DCI including a DL grant. In some aspects, 602 may be performed by DCI reception component 840 in FIG. 8. The DL grant may correspond to the DL grant 402 in FIG. 4, the DL grant 508 in FIG. 5, or the like. For example, the UE 502 may receive DL grant 508 from the base station 504. In some aspects, the DL grant may indicate the PUCCH through an indicated slot index gap. The slot index gap may provide a number of slots between a first slot in which the DL grant is received and a second slot in which a PUCCH is transmitted with at least one aperiodic CSI report. In some aspects, the DL grant may schedule a PUCCH for HARQ feedback and may schedule a PDSCH. In some aspects, the UE may be configured by the base station, in a RRC signaling, to perform CSI reporting based on the DL grant.

At 604, the UE measures the CSI based on a set of resources based on the DL grant. In some aspects, the set of resources may be determined by the UE 502. For example, the UE 502 may measure the CSI based on a set of resources based on the DL grant. In some aspects, 610 may be performed by CSI measuring component 844 in FIG. 8. The UE may perform measurements based on one or more of the DM-RS, decoding statistics, or the dedicated CSI-RS resources as previously described.

At 606, the UE transmits at least one aperiodic CSI report associated with the CSI measurements. For example, the UE 502 may transmit the CSI report 514 to the base station 504. In some aspects, 606 may be performed by aperiodic CSI report transmission component 846 in FIG. 8. The aperiodic CSI report may correspond to the CSI report in the PUCCH 410 in FIG. 4, the CSI report 514 in FIG. 5, or the like. In some aspects, the at least one aperiodic CSI report may include one CSI report associated with the CSI measurements of both (1) the dedicated CSI-RS resource, and (2) the at least one of the PDCCH or the PDSCH, or the DM-RS within the at least one of the PDCCH or the PDSCH. In some aspects, the at least one aperiodic CSI report may include two CSI reports including a first CSI report associated with the CSI measurements of the dedicated CSI-RS resource and a second CSI report associated with the at least one of the PDCCH or the PDSCH or the DM-RS within the at least one of the PDCCH or the PDSCH. In some aspects, the CSI measurements associated with the at least one of the PDCCH or the PDSCH may be determined based on decoding statistics associated with the at least one of the PDCCH or the PDSCH. In some aspects, such as aspects where the UE used the dedicated CSI-RS resource based on the first threshold or the second threshold, the at least one aperiodic CSI report may include information indicating the dedicated CSI-RS resource of a set of dedicated CSI-RS resources that was used to generate the at least one aperiodic CSI report when the set of resources includes the dedicated CSI-RS resource. In some aspects, the at least one aperiodic CSI report may be transmitted in a PUCCH indicated in the DL grant.

Figure 6B:
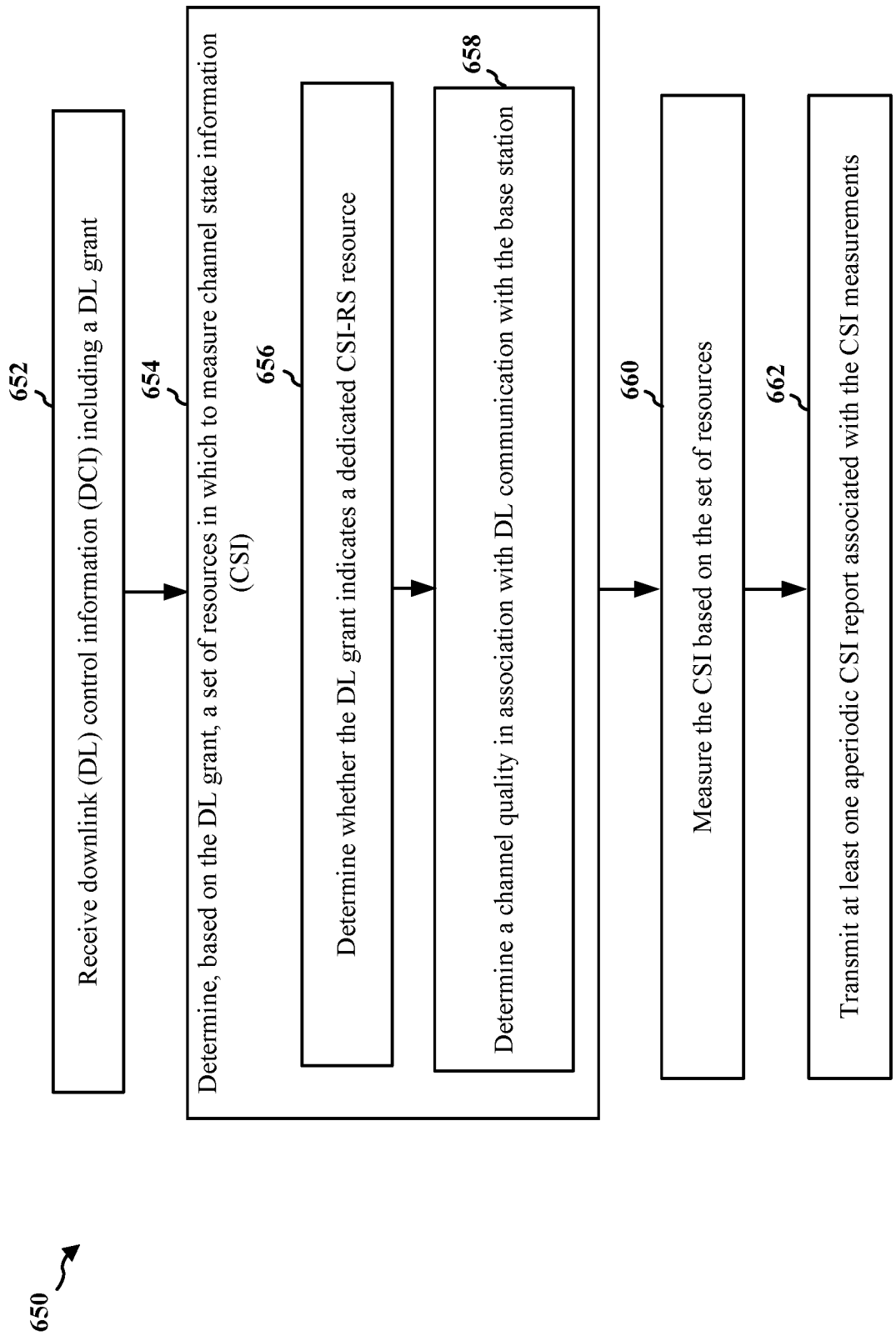
FIG. 6B is a flowchart of a method of wireless communication at a UE.

FIG. 6B is a flowchart 650 of a method of wireless communication. The method may be performed by a UE (e.g., the UE 104, the UE 502; the apparatus 802). The method may help to provide a base station with more up-to-date CSI information which may be used to improve the communication between the base station and the UE.

At 652, the UE receives DCI including a DL grant. In some aspects, 652 may be performed by DCI reception component 840 in FIG. 8. The DL grant may correspond to the DL grant 402 in FIG. 4, the DL grant 508 in FIG. 5, or the like. For example, the UE 502 may receive DL grant 508 from the base station 504. In some aspects, the DL grant may indicate the PUCCH through an indicated slot index gap. The slot index gap may provide a number of slots between a first slot in which the DL grant is received and a second slot in which a PUCCH is transmitted with at least one aperiodic CSI report. In some aspects, the DL grant may schedule a PUCCH for HARQ feedback and may schedule a PDSCH. In some aspects, the UE may be configured by the base station, in a RRC signaling, to perform CSI reporting based on the DL grant.

At 654, the UE determines, based on the DL grant, a set of resources in which to measure CSI. For example, the UE 502 may determine, based on the DL grant, a set of resources in which to measure CSI. In some aspects, 654 may be performed by measurement resources determination component 842 in FIG. 8. In some aspects, as part of 654, at 656, the UE determines whether the DL grant indicates a dedicated CSI-RS resource. The dedicated CSI-RS resource may correspond to the CSI RS 404 in FIG. 4, the CSI-RS 510 in FIG. 5, or the like. In some aspects, the UE may determine that the set of resources includes the dedicated CSI-RS resource when the DL grant indicates the dedicated CSI-RS resource. In some aspects, the UE may determine that the set of resources includes at least one of a PDCCH or a PDSCH, or DM-RS within the at least one of the PDCCH or the PDSCH when the DL grant does not indicate the dedicated CSI-RS resource. The PDCCH or the PDSCH may correspond to the PDSCH 406 in FIG. 4, the PDSCH 512A, or the PDSCH/PDCCH 512N in FIG. 5, or the like. In some aspects, the UE may determine that the set of resources further includes the at least one of the PDCCH or the PDSCH, or the DM-RS within the at least one of the PDCCH or the PDSCH when the DL grant indicates the dedicated CSI-RS resource.

In some aspects, as part of 654, at 658, the UE determines a channel quality in association with DL communication with the base station. In some aspects, the UE may determine that the set of resources includes a dedicated CSI-RS resource when the channel quality is less than or equal to a first threshold. In some aspects, the UE may determine that the set of resources includes at least one of a PDCCH or a PDSCH, or DM-RS within the at least one of the PDCCH or the PDSCH when the channel quality is greater than or equal to a second threshold, the second threshold being greater than or equal to the first threshold. In some aspects, the UE may determine that the set of resources includes the dedicated CSI-RS resource when the channel quality is less than or equal to the second threshold. In some aspects, the UE may determine that the set of resources includes the at least one of the PDCCH or the PDSCH, or the DM-RS within the at least one of the PDCCH or the PDSCH when the channel quality is less than or equal to the first threshold.

At 660, the UE measures the CSI based on the set of resources. For example, the UE 502 may measure the CSI based on the set of resources. In some aspects, 660 may be performed by CSI measuring component 844 in FIG. 8. The UE may perform measurements based on one or more of the DM-RS, decoding statistics, or the dedicated CSI-RS resources as previously described.

At 662, the UE transmits at least one aperiodic CSI report associated with the CSI measurements. For example, the UE 502 may transmit the CSI report 514 to the base station 504. In some aspects, 662 may be performed by aperiodic CSI report transmission component 846 in FIG. 8. The aperiodic CSI report may correspond to the CSI report in the PUCCH 410 in FIG. 4, the CSI report 514 in FIG. 5, or the like. In some aspects, the at least one aperiodic CSI report may include one CSI report associated with the CSI measurements of both (1) the dedicated CSI-RS resource, and (2) the at least one of the PDCCH or the PDSCH, or the DM-RS within the at least one of the PDCCH or the PDSCH. In some aspects, the at least one aperiodic CSI report may include two CSI reports including a first CSI report associated with the CSI measurements of the dedicated CSI-RS resource and a second CSI report associated with the at least one of the PDCCH or the PDSCH or the DM-RS within the at least one of the PDCCH or the PDSCH. In some aspects, the CSI measurements associated with the at least one of the PDCCH or the PDSCH are determined based on decoding statistics associated with the at least one of the PDCCH or the PDSCH. In some aspects, such as aspects where the UE used the dedicated CSI-RS resource based on the first threshold or the second threshold, the at least one aperiodic CSI report may include information indicating the dedicated CSI-RS resource of a set of dedicated CSI-RS resources that was used to generate the at least one aperiodic CSI report when the set of resources may include the dedicated CSI-RS resource. In some aspects, the at least one aperiodic CSI report is transmitted in a PUCCH indicated in the DL grant.

Figure 7:
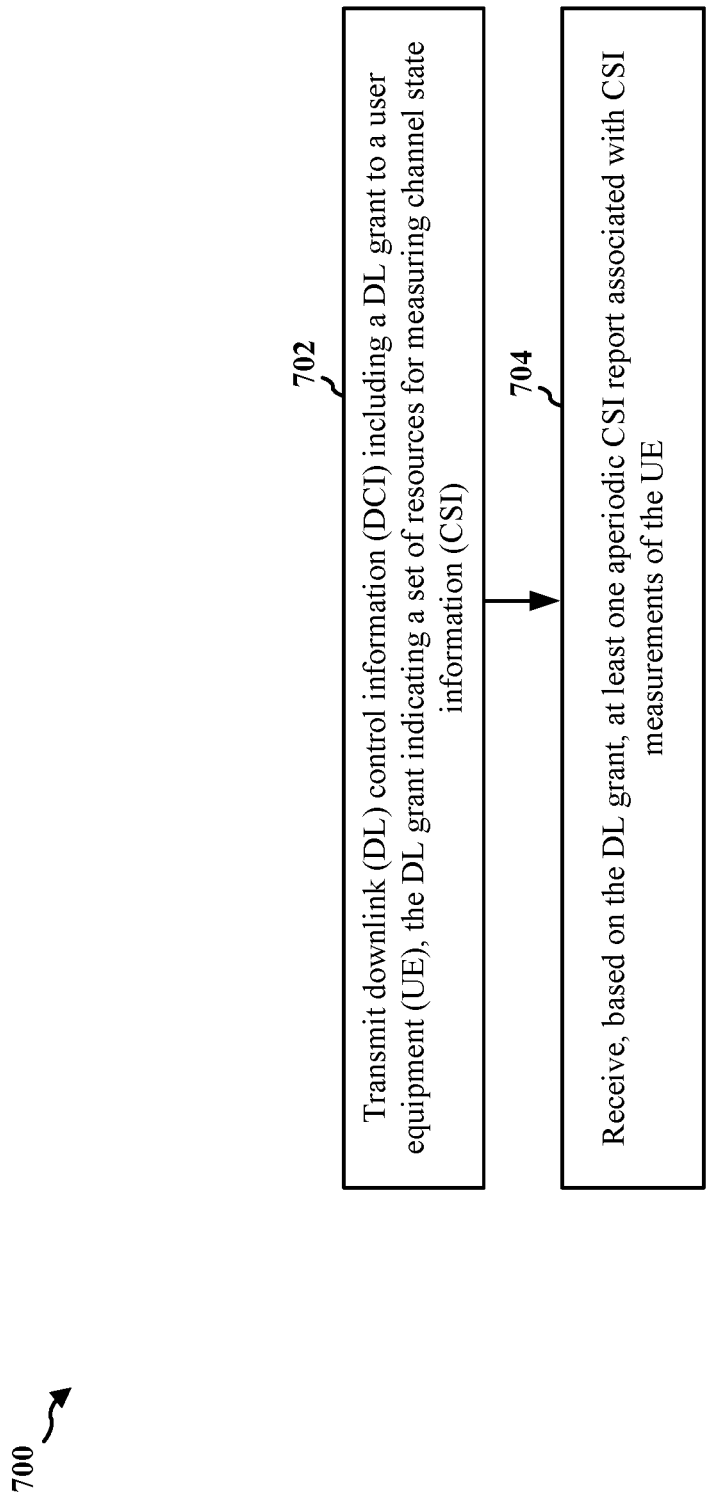
FIG. 7 is a flowchart of a method of wireless communication at a base station.

FIG. 7 is a flowchart 700 of a method of wireless communication. The method may be performed by a base station (e.g., the base station 102/180, the base station 504; the apparatus 902). The method may help to provide a base station with more up-to-date CSI information which may be used to improve the communication between the base station and the UE.

At 702, the base station transmits DCI including a DL grant to a UE. The DL grant may indicate a set of resources for measuring CSI. For example, the base station 504 may transmit a DL grant 508 to the UE 502. In some aspects, 702 may be performed by DCI transmission component 940 in FIG. 9. The DL grant may correspond to the DL grant 402 in FIG. 4, the DL grant 508 in FIG. 5, or the like. In some aspects, the DL grant indicates the PUCCH through an indicated slot index gap. The slot index gap may provide a number of slots between a first slot in which the DL grant is transmitted and a second slot in which a PUCCH is received with at least one aperiodic CSI report. In some aspects, the DL grant schedules a PUCCH for HARQ feedback and schedules a PDSCH. In some aspects, the DL grant may indicate that the set of resources includes a dedicated CSI-RS resource when the DL grant includes information indicating the dedicated CSI-RS resource and may indicate that the set of resources includes at least one of a PDCCH or a PDSCH or DM-RS within the at least one of the PDCCH or the PDSCH when the DL grant excludes information indicating the dedicated CSI-RS resource. In some aspects, the DL grant may further indicate the set of resources includes the at least one of the PDCCH or the PDSCH, or the DM-RS within the at least one of the PDCCH or the PDSCH when the DL grant includes information indicating the dedicated CSI-RS resource. In some aspects, before transmitting the DL grant to the UE, the base station may transmit RRC signaling indicating that the UE may perform CSI reporting based on the DL grant.

At 704, the base station receives, based on the DL grant, at least one aperiodic CSI report associated with the CSI measurements. For example, the base station 504 may receive the CSI report(s) from the UE 502. In some aspects, 704 may be performed by aperiodic CSI report reception component 942 in FIG. 9. The aperiodic CSI report may correspond to the CSI report in the PUCCH 410 in FIG. 4, the CSI report 514 in FIG. 5, or the like. In some aspects, the at least one aperiodic CSI report may include one CSI report associated with the CSI measurements of both (1) the dedicated CSI-RS resource, and (2) the at least one of the PDCCH or the PDSCH, or the DM-RS within the at least one of the PDCCH or the PDSCH. In some aspects, the at least one aperiodic CSI report may include two CSI reports including a first CSI report associated with the CSI measurements of the dedicated CSI-RS resource and a second CSI report associated with the at least one of the PDCCH or the PDSCH or the DM-RS within the at least one of the PDCCH or the PDSCH. In some aspects, the CSI measurements associated with the at least one of the PDCCH or the PDSCH are determined based on decoding statistics associated with the at least one of the PDCCH or the PDSCH. In some aspects, such as aspects where the UE used the dedicated CSI-RS resource based on the first threshold or the second threshold, the at least one aperiodic CSI report may include information indicating the dedicated CSI-RS resource of a set of dedicated CSI-RS resources that was used to generate the at least one aperiodic CSI report when the set of resources includes the dedicated CSI-RS resource. In some aspects, the at least one aperiodic CSI report is received in a PUCCH indicated in the DL grant.

Figure 8:
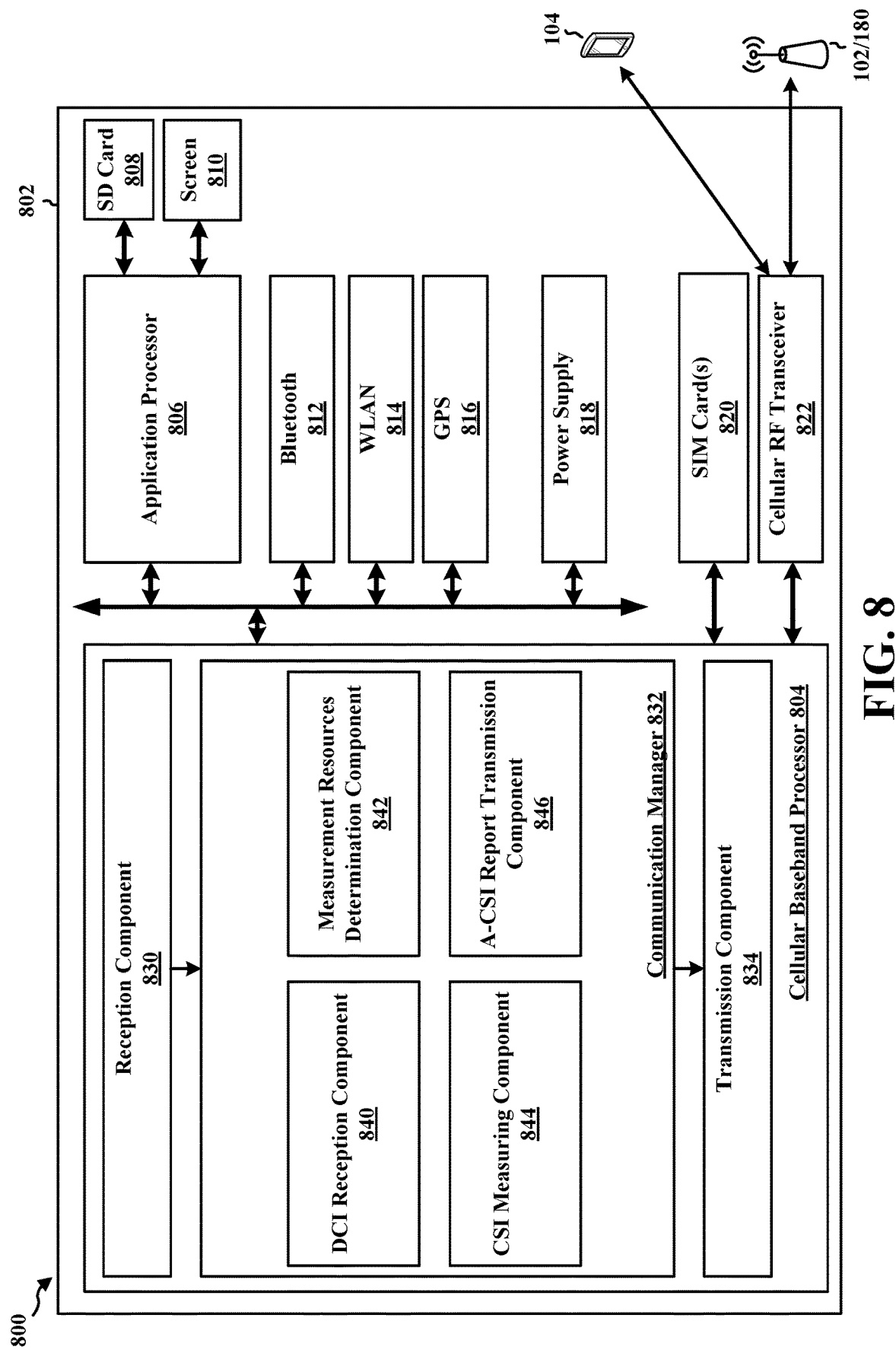
FIG. 8 is a diagram illustrating an example of a hardware implementation for an example apparatus.

FIG. 8 is a diagram 800 illustrating an example of a hardware implementation for an apparatus 802. The apparatus 802 is a UE and includes a cellular baseband processor 804 (also referred to as a modem) coupled to a cellular RF transceiver 822 and one or more subscriber identity modules (SIM) cards 820, an application processor 806 coupled to a secure digital (SD) card 808 and a screen 810, a Bluetooth module 812, a wireless local area network (WLAN) module 814, a Global Positioning System (GPS) module 816, and a power supply 818. The cellular baseband processor 804 communicates through the cellular RF transceiver 822 with the UE 104 and/or BS 102/180. The cellular baseband processor 804 may include a computer-readable medium/memory. The computer-readable medium/memory may be non-transitory. The cellular baseband processor 804 is responsible for general processing, including the execution of software stored on the computer-readable medium/memory. The software, when executed by the cellular baseband processor 804, causes the cellular baseband processor 804 to perform the various functions described supra. The computer-readable medium/memory may also be used for storing data that is manipulated by the cellular baseband processor 804 when executing software. The cellular baseband processor 804 further includes a reception component 830, a communication manager 832, and a transmission component 834. The communication manager 832 includes the one or more illustrated components. The components within the communication manager 832 may be stored in the computer-readable medium/memory and/or configured as hardware within the cellular baseband processor 804. The cellular baseband processor 804 may be a component of the UE 350 and may include the memory 360 and/or at least one of the TX processor 368, the RX processor 356, and the controller/processor 359. In one configuration, the apparatus 802 may be a modem chip and include just the baseband processor 804, and in another configuration, the apparatus 802 may be the entire UE (e.g., see 350 of FIG. 3) and include the aforediscussed additional modules of the apparatus 802.

The communication manager 832 may include a DCI reception component 840 that is configured to receive DCI including a DL grant, e.g., as described in connection with 602 in FIG. 6A, or 652 in FIG. 6B. The communication manager 832 may further include a measurement resources determination component 842 that is configured to determine, based on the DL grant, a set of resources in which to measure CSI, e.g., as described in connection with 654 in FIG. 6B. The communication manager 832 may further include a CSI measuring component 844 that is configured to measure the CSI based on the set of resources, e.g., as described in connection with 604 in FIG. 6A, or 660 in FIG. 6B. The communication manager 832 may further include an aperiodic CSI (A-CSI) report transmission component 846 that is configured to transmit at least one aperiodic CSI report associated with the CSI measurements, e.g., as described in connection with 606 in FIG. 6A, or 662 in FIG. 6B.

The apparatus may include additional components that perform each of the blocks of the algorithm in the aforementioned flowcharts of FIGS. 6A and 6B. As such, each block in the aforementioned flowcharts of FIGS. 6A and 6B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 802, and in particular the cellular baseband processor 804, may include means for receiving DCI including a DL grant. The cellular baseband processor 804 may further include means for determining, based on the DL grant, a set of resources in which to measure CSI. The cellular baseband processor 804 may further include means for measuring the CSI based on the set of resources. The cellular baseband processor 804 may further include means for transmitting at least one aperiodic CSI report associated with the CSI measurements. The aforementioned means may be one or more of the aforementioned components of the apparatus 802 configured to perform the functions recited by the aforementioned means. As described supra, the apparatus 802 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 9:
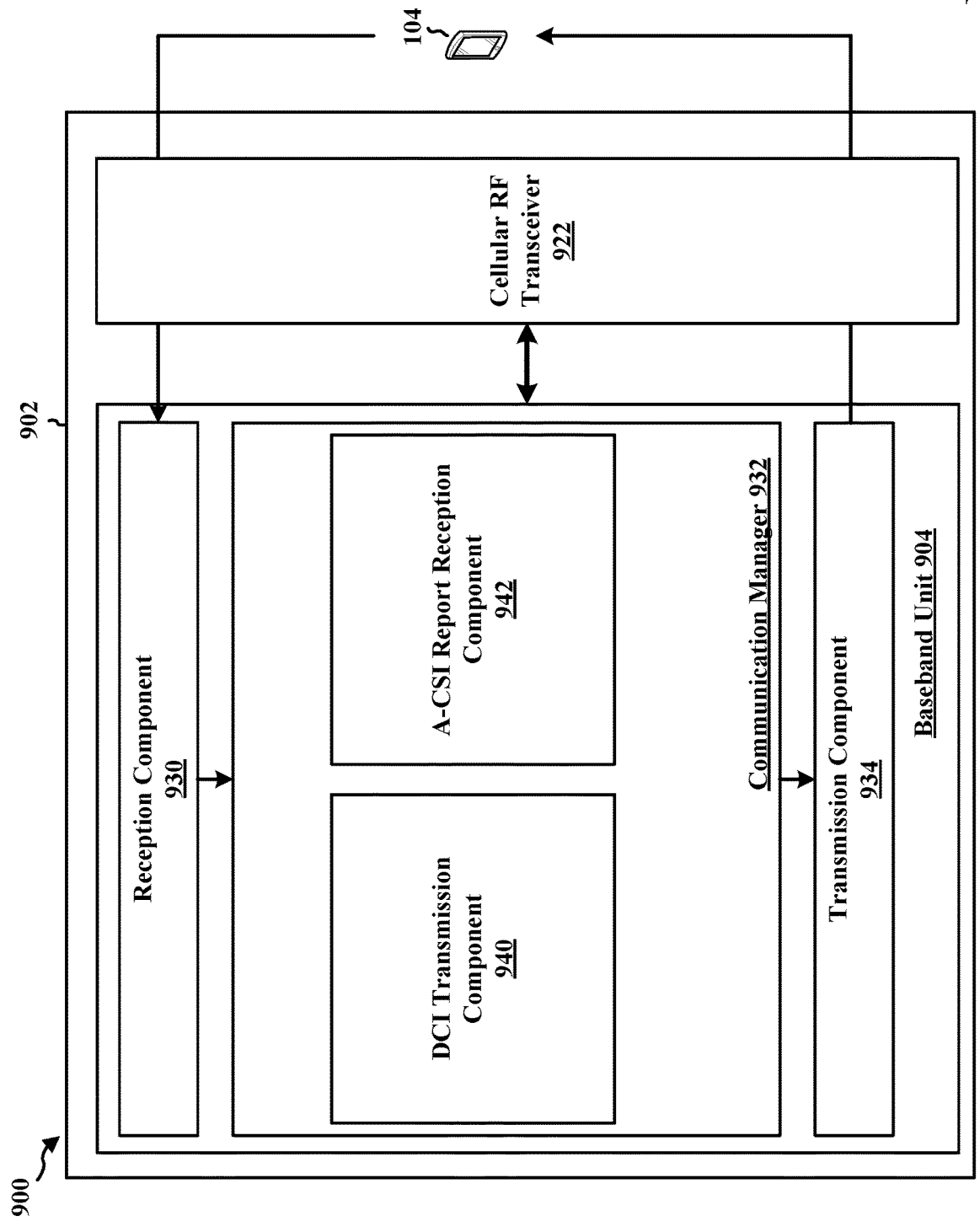
FIG. 9 is a diagram illustrating an example of a hardware implementation for an example apparatus.

FIG. 9 is a diagram 900 illustrating an example of a hardware implementation for an apparatus 902. The apparatus 902 may be a base station and may include a baseband unit 904. The baseband unit 904 may communicate through a cellular RF transceiver 922 with the UE 104. The baseband unit 904 may include a computer-readable medium/memory. The baseband unit 904 is responsible for general processing, including the execution of software stored on the computer-readable medium/memory. The software, when executed by the baseband unit 904, causes the baseband unit 904 to perform the various functions described supra. The computer-readable medium/memory may also be used for storing data that is manipulated by the baseband unit 904 when executing software. The baseband unit 904 further includes a reception component 930, a communication manager 932, and a transmission component 934. The communication manager 932 includes the one or more illustrated components. The components within the communication manager 932 may be stored in the computer-readable medium/memory and/or configured as hardware within the baseband unit 904. The baseband unit 904 may be a component of the BS 310 and may include the memory 376 and/or at least one of the TX processor 316, the RX processor 370, and the controller/processor 375.

The communication manager 932 may include a DCI transmission component 940 that transmits DCI including a DL grant to a UE, e.g., as described in connection with 702 in FIG. 7. The communication manager 932 may further include an aperiodic CSI (A-CSI) report reception component 942 that receives at least one aperiodic CSI report associated with the CSI measurements, e.g., as described in connection with 704 in FIG. 7.

The apparatus may include additional components that perform each of the blocks of the algorithm in the aforementioned flowchart of FIG. 7. As such, each block in the aforementioned flowchart of FIG. 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 902, and in particular the baseband unit 904, may include means for transmitting DCI including a DL grant to a UE. The DL grant may indicate a set of resources for measuring CSI. The baseband unit 904 may further include means for receiving, based on the DL grant, at least one aperiodic CSI report associated with CSI measurements of the UE. The aforementioned means may be one or more of the aforementioned components of the apparatus 902 configured to perform the functions recited by the aforementioned means. As described supra, the apparatus 902 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive DCI including a DL grant; measure CSI based on a set of resources in which to measure the CSI based on the DL grant; and transmit at least one aperiodic CSI report associated with the CSI measurements.

Aspect 2 is the apparatus of aspect 1, wherein the at least one processor is configured to determine the set of resources in which to measure the CSI based on the DL grant by: determining whether the DL grant indicates a dedicated CSI-RS resource; determining the set of resources includes the dedicated CSI-RS resource when the DL grant indicates the dedicated CSI-RS resource; and determining the set of resources includes at least one of a PDCCH or a PDSCH, or DM-RS within the at least one of the PDCCH or the PDSCH when the DL grant does not indicate the dedicated CSI-RS resource.

Aspect 3 is the apparatus of any of aspects 1-2, wherein the at least one processor is configured to determine the set of resources in which to measure the CSI based on the DL grant by: determining the set of resources further includes the at least one of the PDCCH or the PDSCH, or the DM-RS within the at least one of the PDCCH or the PDSCH when the DL grant indicates the dedicated CSI-RS resource.

Aspect 4 is the apparatus of any of aspects 1-3, wherein the at least one aperiodic CSI report comprises one CSI report associated with the CSI measurements of both (1) the dedicated CSI-RS resource, and (2) the at least one of the PDCCH or the PDSCH, or the DM-RS within the at least one of the PDCCH or the PDSCH.

Aspect 5 is the apparatus of any of aspects 1-4, wherein the at least one aperiodic CSI report comprises two CSI reports including a first CSI report associated with the CSI measurements of the dedicated CSI-RS resource, and a second CSI report associated with the at least one of the PDCCH or the PDSCH, or the DM-RS within the at least one of the PDCCH or the PDSCH.

Aspect 6 is the apparatus of any of aspects 1-5, wherein the CSI measurements associated with the at least one of the PDCCH or the PDSCH are determined based on decoding statistics associated with the at least one of the PDCCH or the PDSCH.

Aspect 7 is the apparatus of any of aspects 1-6, wherein the DL grant is received from a base station, and wherein the at least one processor is configured to determine the set of resources in which to measure the CSI based on the DL grant by: determining a channel quality in association with DL communication with the base station; determining the set of resources includes a dedicated CSI-RS resource when the channel quality is less than or equal to a first threshold; and determining the set of resources includes at least one of a PDCCH or a PDSCH, or DM-RS within the at least one of the PDCCH or the PDSCH when the channel quality is greater than or equal to a second threshold, the second threshold being greater than or equal to the first threshold.

Aspect 8 is the apparatus of any of aspects 1-7, wherein the at least one processor is configured to determine the set of resources in which to measure the CSI based on the DL grant further by: determining the set of resources includes the dedicated CSI-RS resource when the channel quality is less than or equal to the second threshold.

Aspect 9 is the apparatus of any of aspects 1-8, wherein the at least one processor is configured to determine the set of resources in which to measure the CSI based on the DL grant further by: determining the set of resources includes the at least one of the PDCCH or the PDSCH, or the DM-RS within the at least one of the PDCCH or the PDSCH when the channel quality is less than or equal to the first threshold.

Aspect 10 is the apparatus of any of aspects 1-9, wherein the at least one aperiodic CSI report comprises information indicating the dedicated CSI-RS resource of a set of dedicated CSI-RS resources that was used to generate the at least one aperiodic CSI report when the set of resources includes the dedicated CSI-RS resource.

Aspect 11 is the apparatus of any of aspects 1-10, wherein the at least one aperiodic CSI report is transmitted in a PUCCH indicated in the DL grant.

Aspect 12 is the apparatus of any of aspects 1-11, wherein the DL grant indicates the PUCCH through an indicated slot index gap, the slot index gap providing a number of slots between a first slot in which the DL grant is received and a second slot in which the PUCCH is transmitted with the at least one aperiodic CSI report.

Aspect 13 is the apparatus of any of aspects 1-12, further comprising a transceiver coupled to the at least one processor.

Aspect 14 is an apparatus for wireless communication at a base station, comprising: a memory; and at least one processor coupled to the memory and configured to: transmit DCI including a DL grant to a UE, the DL grant indicating a set of resources for measuring CSI; and receive, based on the DL grant, at least one aperiodic CSI report associated with CSI measurements of the UE.

Aspect 15 is the apparatus of aspect 14, wherein the DL grant indicates the set of resources includes a dedicated CSI-RS resource when the DL grant includes information indicating the dedicated CSI-RS resource, and indicates the set of resources includes at least one of a PDCCH or a PDSCH, or DM-RS within the at least one of the PDCCH or the PDSCH when the DL grant excludes the information indicating the dedicated CSI-RS resource.

Aspect 16 is the apparatus of any of aspects 14-15, wherein the DL grant further indicates the set of resources includes the at least one of the PDCCH or the PDSCH, or the DM-RS within the at least one of the PDCCH or the PDSCH when the DL grant includes the information indicating the dedicated CSI-RS resource.

Aspect 17 is the apparatus of any of aspects 14-16, wherein the at least one aperiodic CSI report comprises one CSI report associated with the CSI measurements of both (1) the dedicated CSI-RS resource, and (2) the at least one of the PDCCH or the PDSCH, or the DM-RS within the at least one of the PDCCH or the PDSCH.

Aspect 18 is the apparatus of any of aspects 14-17, wherein the at least one aperiodic CSI report comprises two CSI reports including a first CSI report associated with the CSI measurements of the dedicated CSI-RS resource, and a second CSI report associated with the at least one of the PDCCH or the PDSCH, or the DM-RS within the at least one of the PDCCH or the PDSCH.

Aspect 19 is the apparatus of any of aspects 14-18, wherein the at least one aperiodic CSI report is received in a PUCCH indicated in the DL grant.

Aspect 20 is the apparatus of any of aspects 14-19, wherein the DL grant indicates the PUCCH through an indicated slot index gap, the slot index gap providing a number of slots between a first slot in which the DL grant is transmitted and a second slot in which the PUCCH with the at least one aperiodic CSI report is received.

Aspect 21 is the apparatus of any of aspects 14-20, further comprising a transceiver coupled to the at least one processor.

Aspect 22 is a method of wireless communication for implementing any of aspects 1 to 13.

Aspect 23 is an apparatus for wireless communication including means for implementing any of aspects 1 to 13.

Aspect 24 is a computer-readable medium storing computer executable code, where the code when executed by a processor causes the processor to implement any of aspects 1 to 13.

Aspect 25 is a method of wireless communication for implementing any of aspects 13 to 21.

Aspect 26 is an apparatus for wireless communication including means for implementing any of aspects 13 to 21.

Aspect 27 is a computer-readable medium storing computer executable code, where the code when executed by a processor causes the processor to implement any of aspects 13 to 21.

What is claimed is:

1. An apparatus for wireless communication at a user equipment (UE), comprising:
a memory; and
at least one processor coupled to the memory and configured to:
receive downlink (DL) control information (DCI) including a DL grant;
measure channel state information (CSI) based on a set of resources in which to measure the CSI based on the DL grant; and
transmit at least one aperiodic CSI report associated with the CSI measurements;
wherein the at least one processor is configured to determine the set of resources in which to measure the CSI based on the DL grant by:
determining whether the DL grant indicates a dedicated CSI-RS resource;
determining the set of resources includes the dedicated CSI-RS resource when the DL grant indicates the dedicated CSI-RS resource; and
determining the set of resources includes at least one of a physical downlink control channel (PDCCH) or a physical downlink shared channel (PDSCH), or demodulation reference signals (DM-RS) within the at least one of the PDCCH or the PDSCH when the DL grant does not indicate the dedicated CSI-RS resource.

2. The apparatus of claim 1, wherein the at least one processor is configured to determine the set of resources in which to measure the CSI based on the DL grant by:
determining the set of resources further includes the at least one of the PDCCH or the PDSCH, or the DM-RS within the at least one of the PDCCH or the PDSCH when the DL grant indicates the dedicated CSI-RS resource.

3. The apparatus of claim 2, wherein the at least one aperiodic CSI report comprises one CSI report associated with the CSI measurements of both (1) the dedicated CSI-RS resource, and (2) the at least one of the PDCCH or the PDSCH, or the DM-RS within the at least one of the PDCCH or the PDSCH.

4. The apparatus of claim 2, wherein the at least one aperiodic CSI report comprises two CSI reports including a first CSI report associated with the CSI measurements of the dedicated CSI-RS resource, and a second CSI report associated with the at least one of the PDCCH or the PDSCH, or the DM-RS within the at least one of the PDCCH or the PDSCH.

5. The apparatus of claim 1, wherein the CSI measurements associated with the at least one of the PDCCH or the PDSCH are determined based on decoding statistics associated with the at least one of the PDCCH or the PDSCH.

6. The apparatus of claim 1, wherein the DL grant is received from a base station, and wherein the at least one processor is configured to determine the set of resources in which to measure the CSI based on the DL grant by:
determining a channel quality in association with DL communication with the base station;
determining the set of resources includes a dedicated CSI-RS resource when the channel quality is less than or equal to a first threshold; and
determining the set of resources includes at least one of a physical downlink control channel (PDCCH) or a physical downlink shared channel (PDSCH), or demodulation reference signals (DM-RS) within the at least one of the PDCCH or the PDSCH when the channel quality is greater than or equal to a second threshold, the second threshold being greater than or equal to the first threshold.

7. The apparatus of claim 6, wherein the at least one processor is configured to determine the set of resources in which to measure the CSI based on the DL grant further by:
determining the set of resources includes the dedicated CSI-RS resource when the channel quality is less than or equal to the second threshold.

8. The apparatus of claim 7, wherein the at least one processor is configured to determine the set of resources in which to measure the CSI based on the DL grant further by:
determining the set of resources includes the at least one of the PDCCH or the PDSCH, or the DM-RS within the at least one of the PDCCH or the PDSCH when the channel quality is less than or equal to the first threshold.

9. The apparatus of claim 7, wherein the at least one aperiodic CSI report comprises information indicating the dedicated CSI-RS resource of a set of dedicated CSI-RS resources that was used to generate the at least one aperiodic CSI report when the set of resources includes the dedicated CSI-RS resource.

10. The apparatus of claim 1, wherein the at least one aperiodic CSI report is transmitted in a physical uplink control channel (PUCCH) indicated in the DL grant.

11. The apparatus of claim 10, wherein the DL grant indicates the PUCCH through an indicated slot index gap, the slot index gap providing a number of slots between a first slot in which the DL grant is received and a second slot in which the PUCCH is transmitted with the at least one aperiodic CSI report.

12. The apparatus of claim 1, further comprising a transceiver coupled to the at least one processor.

13. An apparatus for wireless communication at a base station, comprising:
a memory; and
at least one processor coupled to the memory and configured to:

transmit downlink (DL) control information (DCI) including a DL grant to a user equipment (UE), the DL grant indicating a set of resources for measuring channel state information (CSI); and receive, based on the DL grant, at least one aperiodic CSI report associated with CSI measurements of the UE;

wherein the DL grant indicates the set of resources includes a dedicated CSI-RS resource when the DL grant includes information indicating the dedicated CSI-RS resource, and indicates the set of resources includes at least one of a physical downlink control channel (PDCCH) or a physical downlink shared channel (PDSCH), or demodulation reference signals (DM-RS) within the at least one of the PDCCH or the PDSCH when the DL grant excludes the information indicating the dedicated CSI-RS resource.

14. The apparatus of claim 13, wherein the DL grant further indicates the set of resources includes the at least one of the PDCCH or the PDSCH, or the DM-RS within the at least one of the PDCCH or the PDSCH when the DL grant includes the information indicating the dedicated CSI-RS resource.

15. The apparatus of claim 14, wherein the at least one aperiodic CSI report comprises one CSI report associated with the CSI measurements of both (1) the dedicated CSI-RS resource, and (2) the at least one of the PDCCH or the PDSCH, or the DM-RS within the at least one of the PDCCH or the PDSCH.

16. The apparatus of claim 14, wherein the at least one aperiodic CSI report comprises two CSI reports including a first CSI report associated with the CSI measurements of the dedicated CSI-RS resource, and a second CSI report associated with the at least one of the PDCCH or the PDSCH, or the DM-RS within the at least one of the PDCCH or the PDSCH.

17. The apparatus of claim 13, wherein the at least one aperiodic CSI report is received in a physical uplink control channel (PUCCH) indicated in the DL grant.

18. The apparatus of claim 17, wherein the DL grant indicates the PUCCH through an indicated slot index gap, the slot index gap providing a number of slots between a first slot in which the DL grant is transmitted and a second slot in which the PUCCH with the at least one aperiodic CSI report is received.

19. The apparatus of claim 13, further comprising a transceiver coupled to the at least one processor.

20. A method of wireless communication at a user equipment (UE), comprising:

receiving downlink (DL) control information (DCI) including a DL grant;

measuring channel state information (CSI) based on a set of resources in which to measure the CSI based on the DL grant; and transmitting at least one aperiodic CSI report associated with the CSI measurements;

determining whether the DL grant indicates a dedicated CSI-RS resource;

determining the set of resources includes the dedicated CSI-RS resource when the DL grant indicates the dedicated CSI-RS resource; and determining the set of resources includes at least one of a physical downlink control channel (PDCCH) or a physical downlink shared channel (PDSCH), or demodulation reference signals (DM-RS) within the at least one of the PDCCH or the PDSCH when the DL grant does not indicate the dedicated CSI-RS resource.

21. The method of claim 20, wherein determining the set of resources in which to measure the CSI based on the DL grant further comprises:

determining the set of resources further includes the at least one of the PDCCH or the PDSCH, or the DM-RS within the at least one of the PDCCH or the PDSCH when the DL grant indicates the dedicated CSI-RS resource.

22. The method of claim 21, wherein the at least one aperiodic CSI report comprises one CSI report associated with the CSI measurements of both (1) the dedicated CSI-RS resource, and (2) the at least one of the PDCCH or the PDSCH, or the DM-RS within the at least one of the PDCCH or the PDSCH.

23. The method of claim 21, wherein the at least one aperiodic CSI report comprises two CSI reports including a first CSI report associated with the CSI measurements of the dedicated CSI-RS resource, and a second CSI report associated with the at least one of the PDCCH or the PDSCH, or the DM-RS within the at least one of the PDCCH or the PDSCH.

24. The method of claim 20, wherein the CSI measurements associated with the at least one of the PDCCH or the PDSCH are determined based on decoding statistics associated with the at least one of the PDCCH or the PDSCH.

25. The method of claim 20, wherein the DL grant is received from a base station, and further comprising determining the set of resources in which to measure the CSI based on the DL grant by:

determining a channel quality in association with DL communication with the base station;

determining the set of resources includes a dedicated CSI-RS resource when the channel quality is less than or equal to a first threshold; and determining the set of resources includes at least one of a physical downlink control channel (PDCCH) or a physical downlink shared channel (PDSCH), or demodulation reference signals (DM-RS) within the at least one of the PDCCH or the PDSCH when the channel quality is greater than or equal to a second threshold, the second threshold being greater than or equal to the first threshold.

26. The method of claim 25, wherein determining the set of resources in which to measure the CSI based on the DL grant further comprises:

determining the set of resources includes the dedicated CSI-RS resource when the channel quality is less than or equal to the second threshold.

27. A method of wireless communication at a base station (BS), comprising:

transmitting downlink (DL) control information (DCI) including a DL grant to a user equipment (UE), the DL grant indicating a set of resources for measuring channel state information (CSI); and receiving, based on the DL grant, at least one aperiodic CSI report associated with CSI measurements of the UE wherein the DL grant indicates the set of resources includes a dedicated CSI-RS resource when the DL grant includes information indicating the dedicated CSI-RS resource, and indicates the set of resources includes at least one of a physical downlink control channel (PDCCH) or a physical downlink shared channel (PDSCH), or demodulation reference signals (DM-RS) within the at least one of the PDCCH or the PDSCH when the DL grant excludes the information indicating the dedicated CSI-RS resource.

* * * * *